(No Model.)
J. P. DAY.
APPARATUS FOR DISPENSING BEER, &c.
No. 518,137. Patented Apr. 10, 1894.
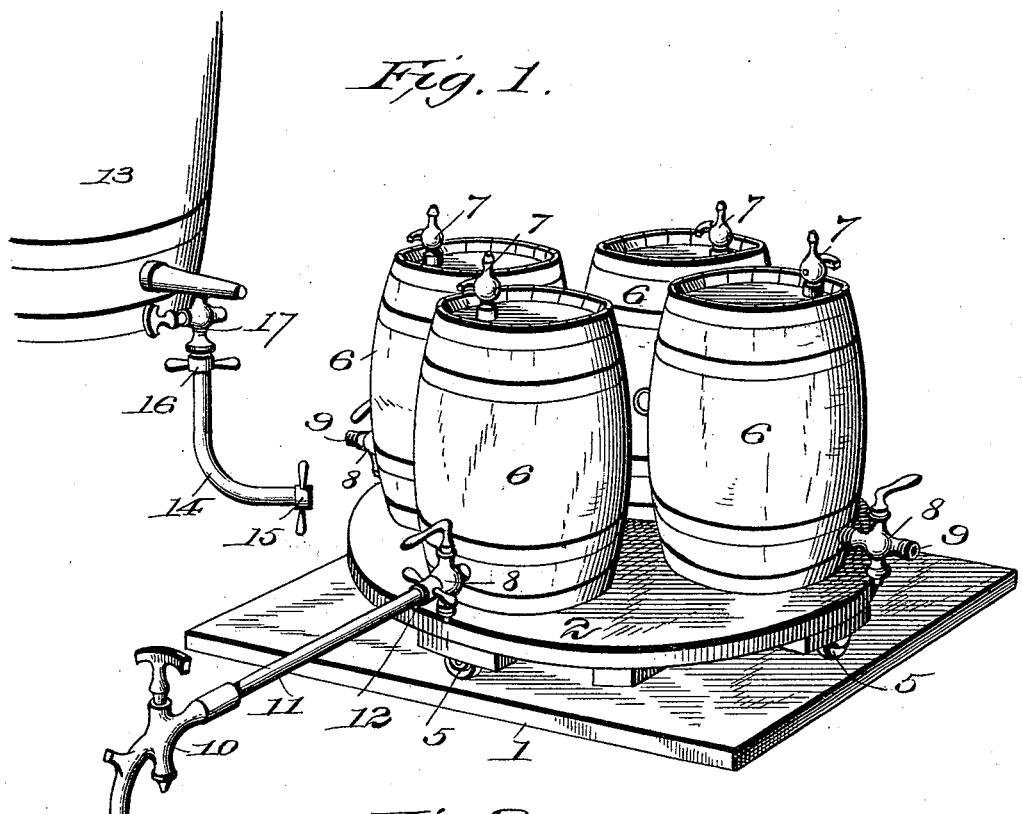
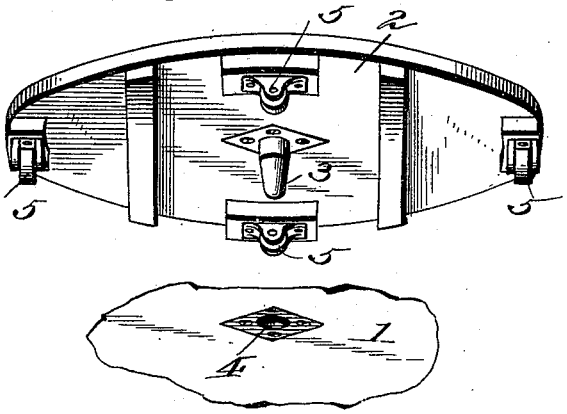

UNITED STATES PATENT OFFICE.

JAMES P. DAY, OF ANNISTON, ALABAMA.

APPARATUS FOR DISPENSING BEER, &c.

SPECIFICATION forming part of Letters Patent No. 518,137, dated April 10, 1894.

Application filed August 24, 1893. Serial No. 483,970. (No model.)

*To all whom it may concern:*

Be it known that I, JAMES P. DAY, a citizen of the United States of America, residing at Anniston, in the county of Calhoun and State of Alabama, have invented certain new and useful Improvements in Apparatus for Dispensing Beer and other Liquids; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to apparatus for dispensing liquids, particularly those which are charged with an effervescent gas, and is designed more especially for the dispensing of beer.

It has primarily for its object to preserve the freshness of the beer and to keep it palatable and wholesome whereby the reputation of the brewery where the beer is made is maintained for brewing a high grade of beer and the sales of the retailer are increased so far as the same can be done by establishing a reputation for furnishing fresh and palatable beer to the consumer.

It is well known that in the ordinary way of dispensing beer from the brewer's keg, it must be sold quickly otherwise it gets flat and unpalatable. This arises from the keg from which the beer is dispensed by the retailer being of such size that before the greater part of the beer can be dispensed, the gas with which the beer is charged escapes from the body of the beer into the empty space of the keg formed by the withdrawal of the beer and as a result the greater portion of the beer is rendered lifeless and stale by the time it is dispensed to the consumer and consequently it is unpalatable and unwholesome. Now, by storing the beer in the comparatively small vessels or kegs, the size of which are approximately proportionate to the business of the retailer, that is, to the quantity of beer that he is accustomed to serve within a given period, the volume or body of the beer from which the draft is drawn can be so regulated that there will be no opportunity for the beer to become stale and unpalatable before the entire volume of it is dispensed.

In carrying out this invention to the best advantage, it is necessary that an apparatus easy of manipulation and admitting of comparatively quick adjustment of parts and change of position of parts with the minimum of labor should be provided; and to that end my invention consists in the construction and in the combination of parts hereinafter particularly described and then sought to be specifically defined by the claims, reference being had to the accompanying drawings forming a part hereof, in which—

Figure 1 represents a perspective of an apparatus embodying my invention; and Fig. 2 a perspective of a revoluble table with parts broken away to illustrate the manner of mounting the same to constitute a support for the vessels or receptacles.

In the drawings the numeral 1 designates a base board suitably supported, and upon which is mounted a movable and in this instance a revoluble table 2, the same being provided with a central pin or pivot 3 which may have its bearing in a cup 4 formed in the base 1. The revoluble table is provided, preferably adjacent to its periphery, at various points on its lower face, with rollers or casters 5 which are illustrated as arranged so as to permit the table to revolve with but little friction in a circle. Upon this moving or revoluble table 2 is mounted a series of casks or receptacles 6, each of which is provided with an air cock or vent 7 and also with a stop cock 8 which is formed with a threaded neck 9 for the coupling thereto of a pipe or tube for filling and for withdrawing beer from the keg or receptacle. A draft cock 10 is arranged in such relation to the point where the liquid will be dispensed and to the series of kegs or receptacles on the moving table that said kegs or receptacles may be brought in succession opposite to the draft cock and placed in communication therewith by a suitable means, for instance, by a pipe 11 and union coupling 12 so that when communication is thus effected the beer in the keg can flow to the draft cock by simply opening the valve of the stop cock 8 as illustrated in Fig. 1 of the drawings, when by turning the valve of the draft cock the beer will flow into the glass or mug in which it is dispensed. The arrangement, as illustrated, is such that by simply turning the table one keg after another is brought into position to be coupled with the draft cock without the necessity of removing any one keg from the table, and as fast as one keg is emptied it is moved out of the way at the same time that a full keg is moved into position for coupling with the draft cock. The kegs or receptacles 6 as fast as emptied can be replaced by others, or refilled by coupling the keg with the main source of supply or keg 13, by means of a flexible or other suitable pipe 14 having a union coupling 15 to screw onto the threaded portion 9 of the stop cock 8 and a union coupling 16 to screw onto the threaded portion of a tapping faucet 17 which is tapped into the main keg or reservoir 13. These couplings are rendered air tight at their joints in any suitable manner.

It is preferred to have the series of kegs or receptacles 6 equal in their aggregate capacity to the capacity of the main keg or reservoir 13 and to fill them in succession from the main keg 13 so that the beer will be transmitted from the main keg or reservoir to the several smaller kegs or receptacles before the gas can to any material extent escape from the beer in the main keg, thus insuring the filling of the smaller kegs or receptacles with beer fully charged with gas.

It will be observed that by the arrangement which I have described and illustrated, the beer will be dispensed from a series of comparatively small vessels and that while being dispensed from one of such vessels, the beer in the other small vessels will retain its full charge of gas as the withdrawal of the beer from the small keg immediately in use cannot to any extent affect the life of the beer in the other small vessels or kegs. On the other hand it will be observed that if the beer were dispensed directly from the main keg or reservoir 13, a large portion of the gas would escape from the body of the beer in that keg and fill the empty space above made by the withdrawal of the beer and thus the life of the beer would be seriously impaired before the whole contents of the main keg could be dispensed and consequently a large body of the beer would be dispensed in a flat and unpalatable condition.

It will be obvious to persons conversant with the art that by my invention material advantages are gained, and that the smaller retail dealers are enabled to dispense as good quality of beer with all its life and freshness and palatableness as can be done by the larger dealers, as each dealer will be provided with kegs or vessels commensurate with his customary sales and can draw from them in succession as fast as the demand may require.

This invention also dispenses with the necessity of employing air pumps which are so commonly used in beer dispensing apparatuses, and affords an effective and inexpensive method of dispensing the beer or other liquid containing effervescent gases.

Other advantages and merits of the invention will occur to the skilled in this art and need not be enumerated here in detail.

It is obvious that changes can be made in the details of construction and arrangement of parts without departing from the essential features of this invention.

Having described my invention and set forth its merits, what I claim is—

1. In an apparatus for dispensing beer and other liquids containing effervescent gases, the combination of a main supply vessel, a series of smaller vessels, a draft cock, means for effecting communication between the main supply vessel and the series of smaller vessels, means for effecting communication between the draft cock and said series of smaller vessels, and a revolving support for said series of smaller vessels for bringing each smaller vessel of the series in succession adjacent to the main vessel to receive the liquid therefrom and then adjacent to said draft tube for the passage of the liquid from the smaller vessels, in succession, to the draft tube, substantially as and for the purposes described.

2. The combination with a series of comparatively small vessels, a draft tube common to all of said small vessels, couplings for connecting said small vessels with said draft tube for drawing the liquid successively from said small vessels through said draft tube, a moving support for said small vessels adapted to bring said vessels successively opposite to said draft tube without removal from said support to enable connection to be made between each one of them and said draft tube, substantially as and for the purposes described.

In testimony whereof I affix my signature in presence of two witnesses.

JAMES P. DAY.

Witnesses:
W. A. JOHNSON,
W. A. HARMON.